United States Patent
Barvosa-Carter et al.

(10) Patent No.: US 8,096,034 B2
(45) Date of Patent: Jan. 17, 2012

(54) REVERSIBLE ATTACHMENT MECHANISMS PROCESS

(75) Inventors: William Barvosa-Carter, Ventura, CA (US); Andrew C. Keefe, Encino, CA (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 14 days.

(21) Appl. No.: 12/845,795

(22) Filed: Jul. 29, 2010

(65) Prior Publication Data
US 2010/0293775 A1  Nov. 25, 2010

Related U.S. Application Data

(62) Division of application No. 11/530,917, filed on Sep. 12, 2006, now Pat. No. 7,836,564.

(51) Int. Cl.
*B21D 39/00* (2006.01)
*A44B 18/00* (2006.01)

(52) U.S. Cl. ... 29/419.1; 29/447; 29/525.01; 29/525.05; 24/442; 310/331

(58) Field of Classification Search ............... 29/419.1, 29/447, 525.01, 525.05; 24/442, 602, 448, 24/450, 451; 310/331, 332
See application file for complete search history.

(56) References Cited

U.S. PATENT DOCUMENTS

| | | | |
|---|---|---|---|
| 4,139,519 A | | 2/1979 | Itoh et al. |
| 4,679,292 A | * | 7/1987 | Mead ............................ 29/447 |
| 4,680,844 A | * | 7/1987 | Rupp ............................ 29/888 |
| 4,813,807 A | * | 3/1989 | Mead ............................ 403/273 |
| 5,120,175 A | * | 6/1992 | Arbegast et al. ............. 411/501 |
| 5,657,516 A | | 8/1997 | Berg et al. |
| 6,815,873 B2 | | 11/2004 | Johnson et al. |
| 6,889,411 B2 | * | 5/2005 | Hinkley et al. ................. 29/11 |
| 6,931,709 B2 | * | 8/2005 | Hugill ............................ 29/447 |
| 7,029,056 B2 | | 4/2006 | Browne et al. |
| 2004/0074069 A1 | | 4/2004 | Browne et al. |
| 2004/0117955 A1 | | 6/2004 | Barvosa-Carter et al. |
| 2005/0172471 A1 | * | 8/2005 | Vietmeier ........................ 29/447 |
| 2005/0275243 A1 | | 12/2005 | Browne et al. |
| 2006/0019510 A1 | | 1/2006 | Rudduck et al. |
| 2006/0186706 A1 | | 8/2006 | Browne et al. |

OTHER PUBLICATIONS

International Search Report mailing date Apr. 10, 2008, 9 pages.

* cited by examiner

*Primary Examiner* — Jermie Cozart
(74) *Attorney, Agent, or Firm* — Cantor Colburn LLP

(57) ABSTRACT

Mechanically interlocking releasable fastener systems include a reinforced shape memory polymer for forming one of the interlocking components. The reinforced shape memory polymer includes a filler material in the form of a fiber and/or platelet. The filler can include an electrically conductive filler, a thermally conductive filler, a dielectric fillers, and mixtures thereof. Also disclosed herein are processes for using the releasable fastener systems.

9 Claims, 4 Drawing Sheets

REVERSIBLE ATTACHMENT MECHANISMS PROCESS

CROSS-REFERENCE TO RELATED APPLICATIONS

This patent application is a divisional of and claims priority to U.S. patent application Ser. No. 11/530,917, filed Sep. 12, 2006, now U.S. Pat. No. 7,836,564 B2 which is incorporated herein by reference in its entirety.

BACKGROUND

The present disclosure generally relates to releasable attachment mechanisms used to fasten, retain, or latch together components of an apparatus or a structure that are to be separated or released under controlled conditions.

Hook and loop fasteners as well as knob and cavity type fasteners are well known and generally used to join two members detachably to each other. These types of fasteners generally have two components disposed on opposing member surfaces. One component typically includes at least one protrusion, i.e., a knob or hook, while the other component typically includes a cavity dimensioned to frictionally fit the knob or a loop of material configured to engage the hooks. When the two components are pressed together they interlock to form a releasable engagement. The resulting joint created by the engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relatively to each other in a direction parallel to their plane of contact. The term "pull force" refers to an action or stress resulting from applied forces that causes or tends to cause two contiguous parts of a body to move relative to each other in a direction perpendicular to their plane of contact.

The shear and pull off forces for these types of systems are generally limited. For example, the dimensions of current knob and cavity fasteners must be carefully considered to permit both fastening and disengagement. Because the knob portion is force-fit within the cavity to effect engagement, the applied pull-off and shear forces for these fastening systems will be limited to the frictional forces associated with pulling or shearing the knob from the cavity or the force levels required to physically deform the knob sufficiently so that it will fit/exit through the cavity entrance. As such, the various forces to effect disengagement will approximate or even greatly exceed those used for engagement. Hook and loop type systems will be similar although the number of hooks engaged with the loop material will collectively provide relatively higher shear and pull-off forces.

It would be desirable to selectively increase the shear and lift off forces when the fastener system is intended to remain fastened and selectively decrease the shear and lift off forces when effecting disengagement so as to minimize the forces necessary to effect disengagement.

BRIEF SUMMARY

Disclosed herein are releasable fastener systems. In one embodiment, the releasable fastener system comprises a cavity portion having a defined and rigid shape; a knob portion formed at least in part of a reinforced polymer, wherein the reinforced polymer comprises a polymer selected to have a reduction in a mechanical property upon an increase in temperature and a filler; and an activation device coupled to the knob portion, the activation device being operable to selectively provide an activation signal and change the flexural modulus property of the knob portion to reduce a shear force and/or a pull-off force.

A process for fastening a fastener comprises activating a reinforced polymer protrusion comprising a polymer and a filler material and changing a modulus property; press fitting the activated reinforced polymer protrusion into a cavity portion so that the protrusion approximates a shape of the cavity portion; and deactivating the reinforced polymer to lock in the shape and effect engagement of the protrusion with the cavity portion.

A process for restraining motion within a plane comprises inserting a surface having at least one protrusion thereon into a cavity, wherein the protrusion is formed at least in part of a reinforced polymer comprising a polymer and a filler material and the cavity comprises a top wall and a bottom wall with at least two linear bands spaced apart and formed of a bimorph material, wherein the spacing between bands is in an amount effective to restrain the protrusion to movement along the plane upon insertion; and activating the bimorph material such that the linear bands assume a curvilinear shape effective to release the protrusion.

The above described and other features are exemplified by the following figures and detailed description.

BRIEF DESCRIPTION OF DRAWINGS

Referring now to the figures, which are exemplary embodiments and wherein the like elements are numbered alike.

DETAILED DESCRIPTION

Figure 1:
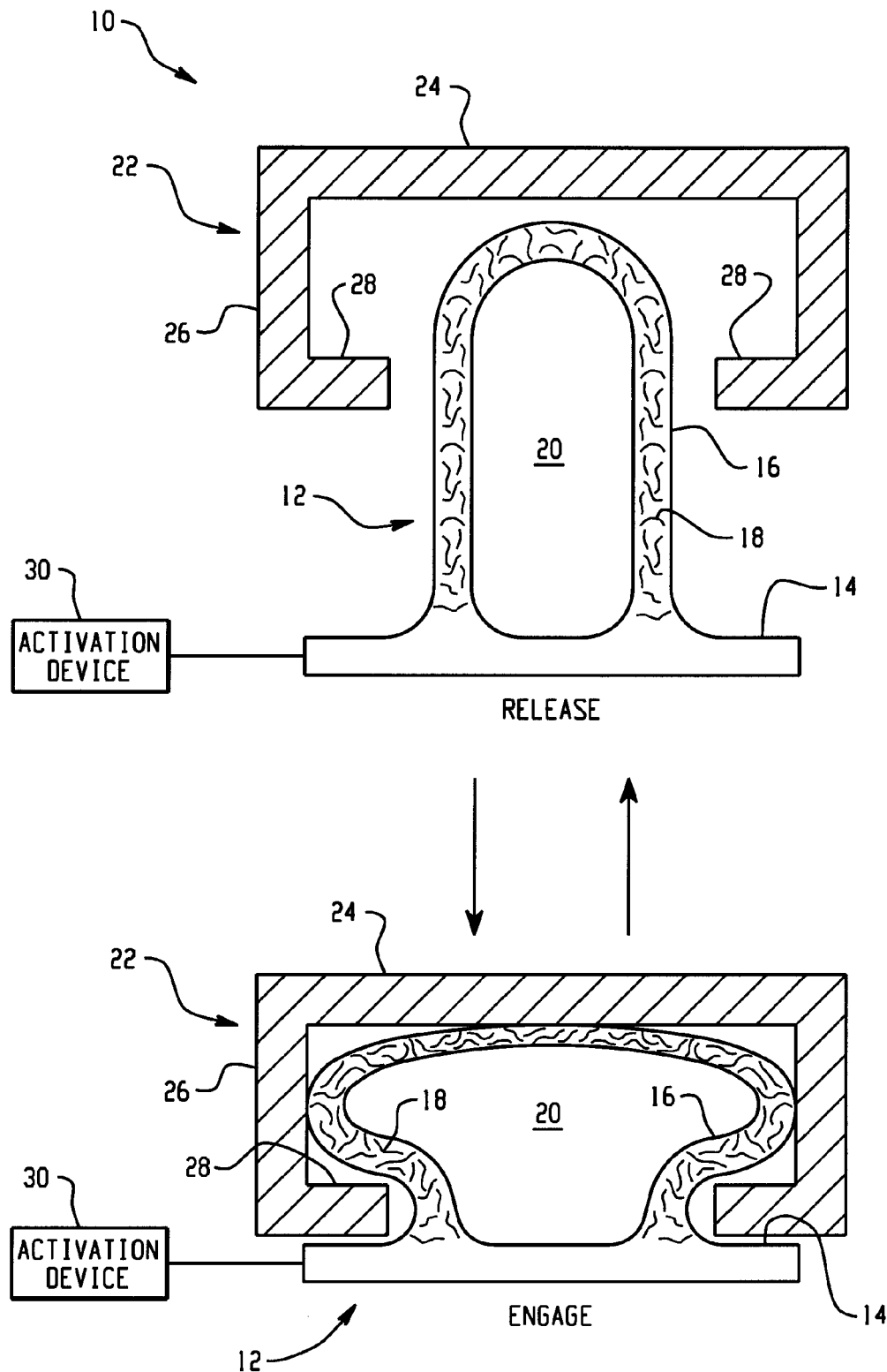
FIG. 1 is a cross sectional view of a releasable fastening system, wherein the releasable fastening system is engaged and disengaged.
Figure 2:
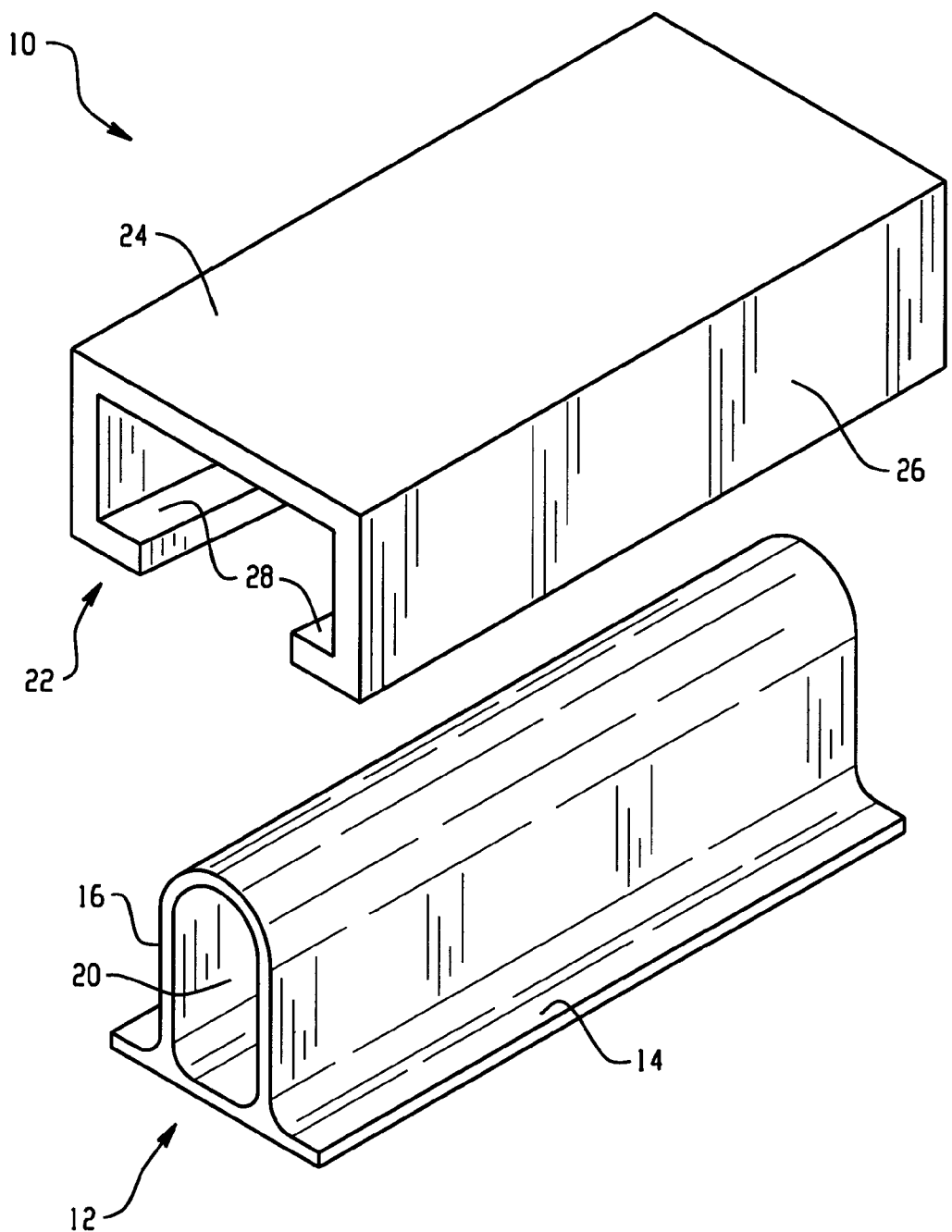
FIG. 2 is a perspective view of the releasable fastening system of FIG. 1, wherein the releasable fastening system is disengaged.

A releasable fastening system in accordance with one embodiment of the present disclosure includes the use of reinforced thermoplastic or thermoset materials that have a large dependence of the modulus upon temperature. In one embodiment, the reinforced materials include fibers or platelets (also referred to herein as "fillers") embedded within the thermoplastic or thermoset polymeric matrix. In other embodiments, a coating is disposed onto an exterior surfaced of the thermoplastic or thermoset material. It is expected that relative to non-reinforced releasable fasteners an increase in pull off resistance to be about 10 to 100× greater and in the range of 0.7 to 7 MPa. Similarly, the pull-off force can be reduced by about 10 to 100× upon heating. Additionally, fixed alignment interconnects are also described with even higher pull-off forces, in the range of 5-50 MPa.

There are a wide variety of suitable thermoplastic or thermoset materials that may be employed in this disclosure that exhibit a large dependence on modulus upon application of a suitable activation signal such as changes in temperature. Of particular relevance are shape memory polymers. Shape memory polymers may be thermo-responsive (i.e., the change in the property is caused by a thermal activation signal), photo-responsive (i.e., the change in the property is caused by a light-based activation signal), moisture-responsive (i.e., the change in the property is caused by a liquid activation signal such as humidity, water vapor, or water), or a combination comprising at least one of the foregoing. It has been discovered that the use of the reinforced SMP material provides a pull off force greater than 1 Megapascals (MPa) when the fastener is intended to remain fastened and a significantly reduced force when the fastener system is placed into a state where it can be intentionally separated. Although shape memory polymers are disclosed, their use is exemplary and one of skill in the art should recognize and appreciate that any polymer whose mechanical properties dramatically reduce with increased temperature can be employed. In one embodiment, SMP materials are employed because that transition occurs over a relatively narrow temperature range. Thus it can be controlled much more readily and the operational temperature range is thereby maximized.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes. It is also noted that other stimuli can be used depending on the SMP composition as previously noted, e.g., photostimulated, moisture stimulated, microwave heating, and the like. For convenience, discussion herein will focus on thermal activation, however, those skilled in the art will appreciate that other stimuli can produce similar results and are intended to be included within scope of this disclosure.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 20° C. Another temperature for shape recovery may be greater than or equal to about 70° C. Another temperature for shape recovery may be less than or equal to about 250° C. Yet another temperature for shape recovery may be less than or equal to about 200° C. Finally, another temperature for shape recovery may be less than or equal to about 180° C.

Suitable polymers for use in the SMPs include thermoplastics, thermosets, interpenetrating networks, semi-interpenetrating networks, or mixed networks of polymers. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, poly-acrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply(butyl methacrylate), poly(isobutyl methacrylate), poly(hexyl methacrylate), poly(iso decyl methacrylate), poly(lauryl methacrylate), poly(phenyl methacrylate), poly(methyl acrylate), poly(isopropyl acrylate), poly (isobutyl acrylate) and poly(octadecyl acrylate). The polymer (s) used to form the various segments in the SMPs described above are either commercially available or can be synthesized using routine chemistry. Those of skill in the art can readily prepare the polymers using known chemistry and processing techniques without undue experimentation.

Reinforcing the shape memory polymer with the fillers (i.e., fibers and/or platelets) can be in a discrete or distributed manner. In one embodiment, fillers that impart electrical conductivity or thermal (heat) conductivity can be added to the shape memory polymer. Examples of suitable heat conductive fillers are metal powders, metal flakes, metal fibers, milled metal fibers, alumina, graphite, boron nitride, aluminum nitride, surface treated or coated aluminum nitrides, silica coated aluminum nitride, carbon nanotubes, carbon fibers and milled carbon fibers, silicone carbide, or the like, or a combination comprising at least one of the foregoing additives.

Examples of suitable electrically conductive fillers are metal powders, metal flakes, metal fibers, milled metal fibers, metal-coated synthetic fibers, metal-coated glass spheres, metal-coated hollow spheres, graphite, carbon nanotubes, vapor grown carbon fibers, carbon fibers and milled carbon fibers, carbon coated synthetic fibers, buckyballs, electroactive polymers, antimony-doped tin oxide, conductive metal oxides such as indium tin oxide, tertiary ammonium salt compounds, carbon blacks, coke, or the like, or a combination comprising at least one of the foregoing electrically conductive fillers.

These fillers can be added to the coating composition at concentrations effective to obtain desired properties. Other fillers that can be used to control dielectric constants are well known. Examples include various metal oxides, metal powders, metal fibers, micro-balloons, or the like, or a combination comprising at least one of the foregoing fillers.

Still further, the reinforcements can be configured to affect the friction and wear properties as may be desired for some applications. For example, a spectra-fiber outer layer (i.e., a surface coating) can be deposited onto an exterior surface of the SMP to improve lifespan by mitigating the effects of rubbing or vibration during use, which could otherwise result in gouging or cutting at edges. Surface coatings could also be provided and configured to affect heat transfer, cosmetic appearance, water absorption, corrosion resistance, without impacting the intended performance of the attachment. Additionally, surface coatings can enhance the pull-out strength or, oppositely, ease the removal of the attachment. Those of skill in the art can readily prepare the reinforced shape memory polymers using known processing techniques without undue experimentation, e.g., injection molding, extrusion, lamination, spray coating, and the like.

By way of example, FIG. 1 illustrates a knob and cavity type fastener system generally designated by reference numeral 10. The knob portion 12 includes surface 14 having at least one "smart" protrusion 16 extending therefrom containing at least a portion made from the reinforced SMPs (in this embodiment, the fibers and/or platelets are within the polymeric matrix and are shown by reference numeral 18). It should be noted that the protrusion geometry is not intended to be limited. For example, the protrusion can take the form of a hook, a button, a raised strip as shown, and the like. Preferably, the knob portion 12 includes an interior space 20, which allows the compressive forces for effective engagement to be modified or tailored to meet a specific requirement.

The cavity portion 22 includes a base wall 24 with sidewalls 26 extending from the wall. A retaining wall 28 extends from the sidewalls and is configured to retain the knob portion 12 during engagement. In one embodiment, the cavity portion is formed of a substantially inflexible material. Materials suitable for manufacturing the cavity portion material include extruded metals such as aluminum, steel, iron, and the like, or thermoplastics such as polypropylene, polyethylene, polyamide, polyester, polystyrene, polyvinyl chloride, acetal, acrylic, polycarbonate, polyphenylene oxide, polyurethane, polysulfone, poly-paraphenylene terephthalamide, metal, ceramic, and the like. These materials can be used in other embodiments that utilize a relatively rigid and inflexible material. For example, the knob portion can be formed of similar materials when the cavity portion includes a portion formed of the reinforced SMP.

The cavity geometry is such that pressing the two surfaces together results in the engagement of the smart protrusions 12 on the one surface with the cavities 22 on the other creating a joint that is strong in shear and pull-off. Prior to and during compression the knob portion 12 within the cavity 22, it may be desirable to thermally activate the reinforced SMP portion with a suitable activation device 30. The reinforced SMP portion is then cooled while maintaining the compressive forces to such that the knob portion 12 retains the shape of the cavity portion 22 once the compressive forces are released. Advantageously, the use of the fibers and/or platelets strengthens the engagement upon cooling. That is, the holding force is increased thereby providing a stronger joint. The use of reinforced SMP materials, for example, have dramatically enhanced stiffness and shear strength relative to unreinforced SMP materials.

Remote disengagement of the two surfaces is to be effected by raising the temperature of the reinforced SMP containing protrusions 12 to a level sufficient to dramatically decrease their stiffness and/or to allow them to revert under load to a considerably less interlocking geometry previously set into their higher temperature phase. This dramatic decrease in stiffness and or change to a less interlocking geometry will dramatically reduce the engagement forces holding the two surfaces together and allow them to be easily detached from each other whether in peal, shear, or pull-off in a direction normal to the surfaces. Following disengagement, the active surface is cooled or allowed to cool, thereby regaining its previously set shape and prepared for re-engagement.

Although reference has been made to thermal activation, as previously discussed, some shape memory polymer materials can undergo a modulus change in response to photo-stimuli, moisture, and the like. These materials will function in a similar to that discussed above with respect to thermal activation albeit with a different activation signal.

Figure 3:
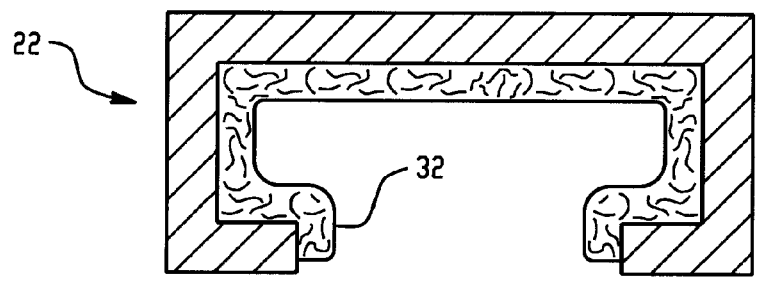
FIG. 3 is a cross sectional view of a cavity portion suitable for use in a releasable fastener system in accordance with an embodiment of the present disclosure.

In another embodiment, the cavity portion 22 is formed of the reinforced shape memory polymeric material whereas the knob portion 12 is formed of a relatively rigid and of a fixed dimensioned material. Still further, in other embodiments, the cavity portion 22 can further include a liner 32 formed of the reinforced shape memory polymer material as provided in FIG. 3. In this manner, the forces associated with engagement and disengagement can be further controlled. It should also be noted that releasable fastener can have multiple protrusions provided on one substrate and corresponding cavities provided on the other substrate. Alternatively, mixtures of cavities and protrusions can be provided on both substrates, wherein the cavities and knob portions of each respective substrate are complementary. During engagement, the reinforced shape memory portion will closely approximate the shape of the knob portion upon compression against the liner 32.

Still further, in other embodiments, the knob portion 12 can include an external layer or features of uniform or variable thickness formed of the reinforced shape memory polymer material. During engagement, the reinforced shape memory portion will closely approximate the shape of the cavity portion upon compression and insertion into it.

In another embodiment, the releasable fastener is configured in which relative motion of "attached" surfaces is constrained in only one or two of three dimensions, i.e., in a line or a plane but not normal to the line or the plane. Expanding on this, there are numerous applications in which it is desirable to have either resistance to normal forces, resistance to shear in one direction only or resistance to motion in only two but not all three directions. As an example of the latter, reinforced SMP protrusions (e.g., knobs) can be shaped for example like short cylinders on one surface and corresponding cavities on the other surface. Selectively activating the reinforced SMP protrusion can be used to assist alignment within the corresponding cavities. Subsequent cooling of the reinforced shape memory polymer would lock the surfaces against shear motion, whereas re-softening can be used to permit sliding release. The reverse arrangement would also have interesting properties in terms of a pair of surfaces one with SMP lined cavities and the other with rigid knobs. For example, liners of the cavities could be heated to dramatically lower sliding/shear forces/lateral release, thereby allowing the two surfaces to naturally seek an alignment that minimized potential energy, i.e., the protrusions and indents would actually be self mating if the patterns were reasonably dense, and that the energy input to release when the mating elements were softened was just that needed to separate the surfaces sufficiently to allow the knobs to clear the holes. As another example of a two dimensional constraint, a dovetail shaped slot connection would constrain motion normal to and along one axis in the plane of the two joined surfaces.

In another embodiment, a releasable fastener system is configured to prevent sliding displacement while maintaining relative ease of engagement and/or disengagement normal to the plane or surface. The system comprises two specialized surfaces: a first surface is patterned with specially shaped, regularly arranged protrusions designed to mate optimally with a second, active surface, that is patterned with specially shaped rows of material containing a bimorph structure that will reversibly deform in a manner that allows the protrusions from the first surface to engage with the second surface, when a command is given (that command being an electric field, magnetic field, thermal field, ion exchange, etc., as appropriate for the active material that gives rise to the bimorph deformation, e.g. a piezoelectric or dielectric elastomer, a magnetostrictive material, a shape memory material, an ionic polymer metal composite, etc. . . . ). When the deformation of the second surface is reversed, the protrusions of the first surface will be captured and prevented from translating.

Many bimorph structures can be activated at high frequencies. By activating the bimorph structure in the second active surface at high rates, the first surface and the second active surface can be engaged and disengaged significantly easier than if the second surface is held in two static configurations. The protrusions on the first surface can more easily find the mating channels between the rows in the second surface as the bimorph structures in the channels oscillate back and forth. Additionally, when operated at resonance, the amplitude of oscillation of the bimorph structures is maximized and the mating can occur optimally.

The releasable fastener system described above can be designed to reversibly hold two surfaces or structures together rigidly in three dimensions as is typically desired for such devices. The releasable fastener system can also be configured to be more effective in sliding or shearing while allowing for passive release by pulling in a direction normal to the surface. For example, a block with faces of the first surface is placed upon a table made with the second surface may be easily placed onto the table and removed with little force normal to the table surface; however, sliding the block on the table surface would be impeded by the releasable fastener system. Pull-off force would be required to overcome friction and some mechanical engagement, though if the second surface were activated that removal force would nearly vanish.

Figure 4:
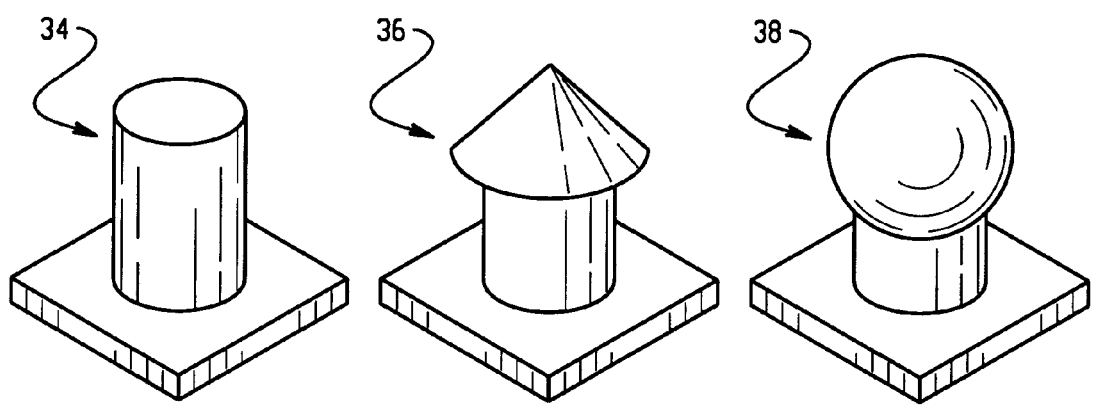
FIG. 4 illustrates perspective views showing various geometries of a protrusions for use in a releasable fastener system in accordance with an embodiment of the present disclosure.

Protrusions for the first surface may be of many geometric shapes; particularly, but not exclusively, those that are conducive to interlocking or hooking. FIG. 4 show a simplified depiction of various protrusions 34, 36, and 38. In one embodiment, the feature size is on the order of a millimeter or smaller and the density and pattern is such that these protrusions match the spacing of the cavity portion 22 and have sufficient quantity to provide the desired strength upon interlocking.

Figure 5:
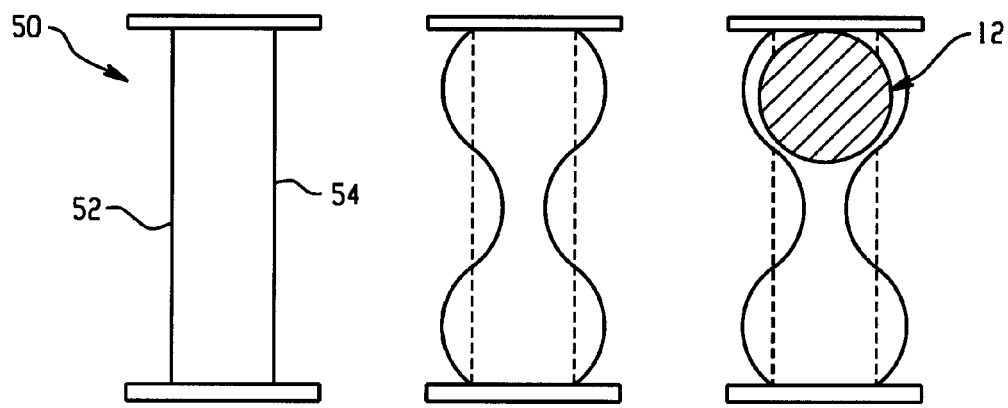
FIG. 5 illustrates a bimorphic cavity suitable for use in a releasable fastener system in accordance with another embodiment of the present disclosure.

The bimorph features for a cavity portion 50 are depicted as single vertical lines 52, 54 in FIG. 5. When a stimulus field is applied, the beam-like structures deform in a regular and opposite way, such as mirrored sinusoids, as shown in the middle image. In one embodiment, piezoelectric patches may be applied and excited such that each beam-like structure is 180° out of phase with its neighbor, thereby creating the maximum opening distance periodically. When the excitation is ceased, the beam-like structures return to their straight positions and compress and trap the protrusions, e.g., protrusion 12 as shown in FIG. 1. When the excitation occurs at a frequency near a resonant frequency of the beam-like structures, the opening distance can be enhanced, or the activation energy can be reduced. In one embodiment, the modal vibration creates a sinusoidal pattern at regular intervals based on the frequency of excitation.

Figure 6:
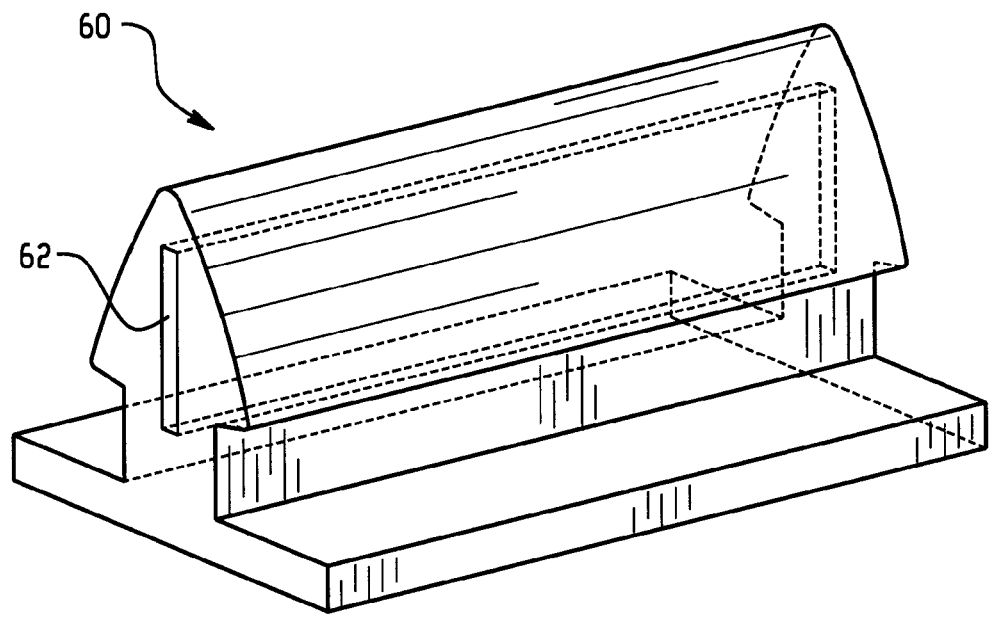
FIG. 6 illustrates a protrusion suitable for use in a releasable fastener system in accordance with another embodiment of the present disclosure.

Alternatively, a bimorph material 62 such as a piezoelectric can be embedded with the protrusion 60 as shown in FIG. 6. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. Although unimorph strips can be used, it is preferred that the strips are bimorph, because bimorphs generally exhibit more displacement than unimorphs. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrenesulfonate) ("PSS"), poly S-119 (Poly(vinylamine) backbone azo chromophore), and their derivatives; polyfluorocarbines, including polyvinylidene fluoride ("PVDF"), its co-polymer vinylidene fluoride ("VDF"), trifluorethylene (TrFE), and their derivatives; polychlorocarbons, including poly(vinylchloride) ("PVC"), polyvinylidene chloride ("PVC2"), and their derivatives; polyacrylonitriles ("PAN"), and their derivatives; polycarboxylic acids, including poly (methacrylic acid ("PMA"), and their derivatives; polyureas, and their derivatives; polyerethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, T, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, $GaAs$, $AgCaSe_2$, ZnSe, GaP, InP, ZnS and mixtures thereof.

Figure 7:
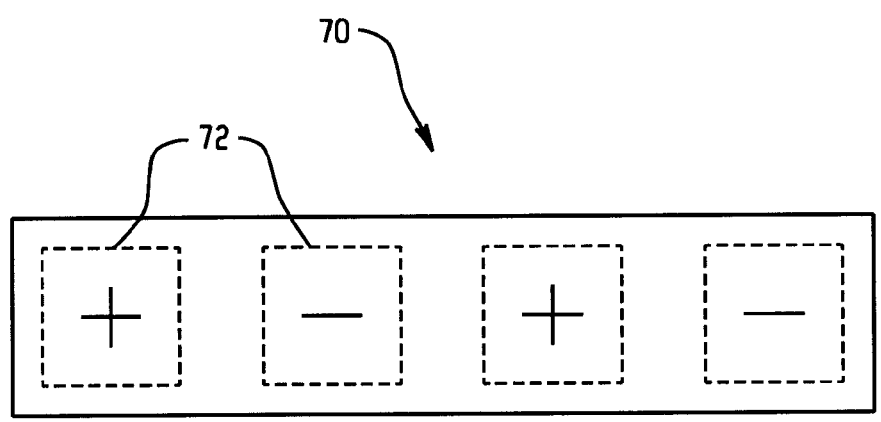
FIG. 7 illustrates a piezoelectric bimorph for use in a releasable fastener system in accordance with another embodiment of the present disclosure.

A design for a piezoelectric bimorph 70 is shown in FIG. 7, where the beam-like structure has a solid rectangular shape and the polarized piezoelectric patches 72 are the dashed squares, the + & − signs indicate the polarity of the piezoelectric patch such that the preferred bending mode is induced.

Although reference has been made to bimorphs formed of piezoelectrics, it should be apparent to those skilled in the art that other bimorph materials ca be used to provide similar behavior. For example, ionic polymer actuators such as ionic polymer metal composite and conductive polymers intrinsically exhibit this effect due to the transport of ionic species that cause swelling across a membrane. Bimorphs can also be based on magnetostrictive materials (activated by a magnetic field), shape memory alloys (activated by a thermal field), and other materials suitably arranged for bimorph behavior in response to a suitable stimulus field.

The releasable fastener system can be employed to releasably attach two structural elements together to provide a mechanism that delivers different load paths in the event of an impact sufficient to activate the release mechanism. Welded and adhesively bonded "rigid" joints provide fixed load paths. Moreover, the releasable fastener systems can be configured such that an energy source is not required to maintain engagement of the joint. Energy, i.e., the activation signal, can be used to provide separation, thereby minimizing the impact on energy sources during use of the releasable fastener system.

Advantageously, the releasable fastener systems described herein are extremely versatile and can be used in a variety of different applications that may benefit from the reversible "higher load/force" attachment technology provided herein. For example, in the automotive arts, the releasable fastener systems can be used for docking of autonomy (passenger pod) to skateboard type chassis; truck beds to frames; attachment of entertainment systems to data-enabled roof/floor/seatbacks; attachment of interior components (car seats, luggage containers, snugdowns, etc. . . . ); assembly of automotive components and whole automobiles; engaging/disengaging stiff/flexible dynamic structural elements to control the ride and handling of a vehicle (could be very important for on-road/off-road dual use vehicles, and/or for military vehicles); smart attachments for under body high maintenance components; attachment for transport—including overhead crane, hoist; compliant yet secure interfaces for shipment of parts; assembling modules—consistent with modular approach to vehicle assembly; totally customizable and/or reconfigurable vehicle made from interchangeable building blocks); and the like. Exemplary non-automotive applications include, but are not intended to be limited to, modular transportation systems. Military examples include transport trucks with modular elements that can be disassembled from the vehicle to provide command/control centers, troop or civilian shelter; modular armor systems; fixed geometry armor plating (e.g. hexagons, interlocking elements) attached to the outside of vehicle surfaces using high-strength reversible attachments; and the like.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A process for fastening a fastener, the process comprising:
   activating a reinforced polymer protrusion comprising a polymer and a filler material and changing a modulus property;
   press fitting the activated reinforced polymer protrusion into a cavity portion so that the protrusion approximates a shape of the cavity portion; and
   deactivating the reinforced polymer to lock in the shape and effect engagement of the protrusion with the cavity portion.

2. The process of claim 1, wherein activating the reinforced polymer comprises providing a thermal stimuli, a photo stimuli, a microwave stimuli, a moisture stimuli, and combinations thereof to the reinforced polymer to effect the change in the modulus property.

3. The process of claim 1, further comprising activating the reinforced polymer to change the modulus property and removing the protrusion from the cavity portion.

4. The process of claim 1, wherein the polymer is a shape memory polymer.

5. A process for restraining motion within a plane, the process comprising:
   inserting a surface having at least one protrusion thereon into a cavity, wherein the protrusion is formed at least in part of a reinforced polymer comprising a polymer and a filler material and the cavity comprises a top wall and a bottom wall with at least two linear bands spaced apart and formed of a bimorph material, wherein the spacing between bands is in an amount effective to restrain the protrusion to movement along the plane upon insertion; and
   activating the bimorph material such that the linear bands assume a curvilinear shape effective to release the protrusion.

6. The process of claim 5, wherein the bimorph material is selected from a group consisting of a piezoelectric, an ionic metal polymer composite, and a conductive polymer.

7. The process of claim 5, wherein the reinforced polymer comprises a dielectric filler selected from a group consisting of various metal oxides, metal powders, metal fibers, microballoons, and mixtures thereof.

8. The process of claim 5, wherein the filler material is selected from a group consisting of metal powders, metal flakes, metal fibers, milled metal fibers, metal-coated synthetic fibers, metal-coated glass spheres, metal-coated hollow spheres, alumina, graphite, carbon nanotubes, vapor grown carbon fibers, carbon fibers and milled carbon fibers, carbon coated synthetic fibers, buckyballs, electroactive polymers, antimony-doped tin oxide, conductive metal oxides such as indium tin oxide, tertiary ammonium salt compounds, carbon blacks, coke, boron nitride, aluminum nitride, surface treated or coated aluminum nitrides, silica coated aluminum nitride, silicone carbide, and mixtures thereof.

9. The process of claim 5, wherein the polymer is a shape memory polymer.

\* \* \* \* \*